UNITED STATES PATENT OFFICE.

FRANCISCA PONS Y PON, OF NEW YORK, N. Y.

COMPOSITION FOR LAUNDRY USE.

SPECIFICATION forming part of Letters Patent No. 232,543, dated September 21, 1880.

Application filed August 5, 1880. (No specimens.)

*To all whom it may concern:*

Be it known that I, FRANCISCA PONS Y PON, of the city, county and State of New York, have invented an Improvement in Compounds for Laundry Use, of which the following is a specification.

The object of this invention is to provide a material which when added to starch for laundry purposes will give a stiffness to the fabric and a gloss to its surface unattainable by the use of starch alone, and which, moreover, will enable the operations of glossing the surface of fabrics by "ironing," as it is termed, to be performed with much less labor than is ordinarily required.

The invention consists in the compound hereinafter fully described and set forth, and which is designed to be mingled with the starch preparatory to use of the latter for stiffening and glossing fabrics by the usual operation of ironing.

In the manufacture or production of the compound embraced by my said invention, I take ten ounces of borax and four ounces of olive-oil, or other oil equivalent thereto, and I mingle the borax and the oil with a gallon of water, and place the vessel containing this mixture in a hot-water bath, by which means the mixture is heated to a temperature more or less approaching that of the boiling water by which the vessel is surrounded, whereupon by stirring or other suitable manipulation I thoroughly mingle and unite the aforesaid elements of the mixture, which done, I add three ounces of beeswax, one ounce of lemon-juice, two ounces of gum-arabic, and two ounces of alcohol, these additional constituents being in like manner incorporated with the previous mixture of borax, oil, and water, and remaining subjected to the action of the heat of the water-bath until the whole of the above-specified components are united, which ordinarily will require about seven minutes. The vessel containing the mixture is then removed from the water-bath and allowed to cool, whereupon any scum that may arise to the surface is skimmed off, and any sediment that may remain in the bottom of the vessel is separated by decanting the liquid. The latter constitutes the compound embraced by my said invention, and for storage, transportation, or sale may be placed in any suitable receptacle, such as bottles or cans.

In order to use the said compound it is mingled with common laundry starch in the proportions of about five ounces of the liquid to a pound of starch. The starch being thus mingled with the liquid aforesaid is ready for immediate use or application (after dilution with water to bring it to the preferred consistence, which should be about that of starch prepared in the ordinary manner) to the fabrics. The starch prepared according to my said invention, as aforesaid, is applied to the fabrics in any ordinary or suitable manner, and the fabric subsequently is ironed in the same way as fabrics starched in the usual way, but with this difference in the result, that whereas starch made and applied as it is commonly done affords to the fabric only an imperfect gloss and insufficient stiffening, fabrics treated with starch that has been treated with the compound embraced by my invention, as aforesaid, are very thoroughly stiffened, and have a very high polish or gloss, which much enhances their appearance; a very great additional advantage being also secured by means of my said invention, inasmuch as all the labor, expense, and loss of time incident to the usual practice of boiling the starch is, by my said invention, entirely avoided.

It is to be observed that while the proportions herein specified are those which I prefer, the same may be somewhat modified without affecting the principle of my said invention.

What I claim as my invention is—

The herein-described new article for laundry use, composed of borax, oil, water, wax, lemon-juice, gum-arabic and alcohol, all substantially as and for the purpose herein set forth.

FRANCISCA PONS Y PON.

Witnesses:
CHAS. H. DOXAT,
H. F. PARKER.